July 20, 1943.  C. W. MOTT ET AL  2,324,867
MOVABLE MEANS FOR TRACTOR MOUNTED IMPLEMENTS
Filed March 26, 1940  5 Sheets-Sheet 1

Inventors
Carl W. Mott
Hiram P. Smith
By
Atty.

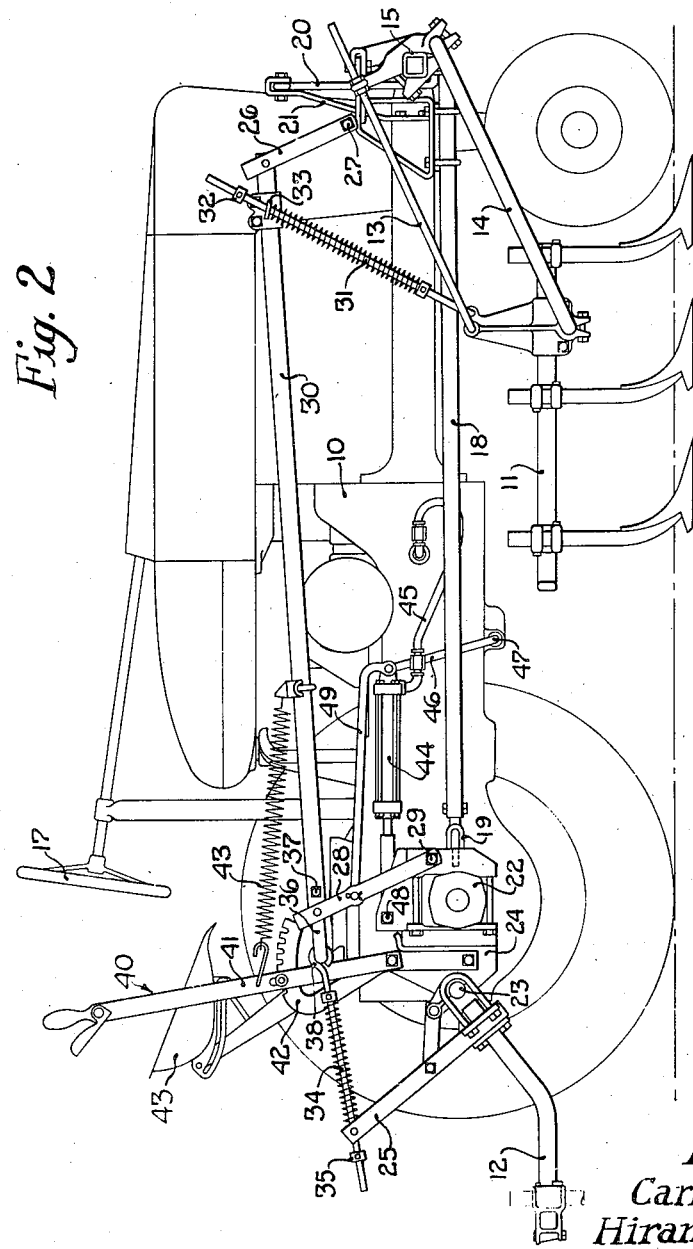

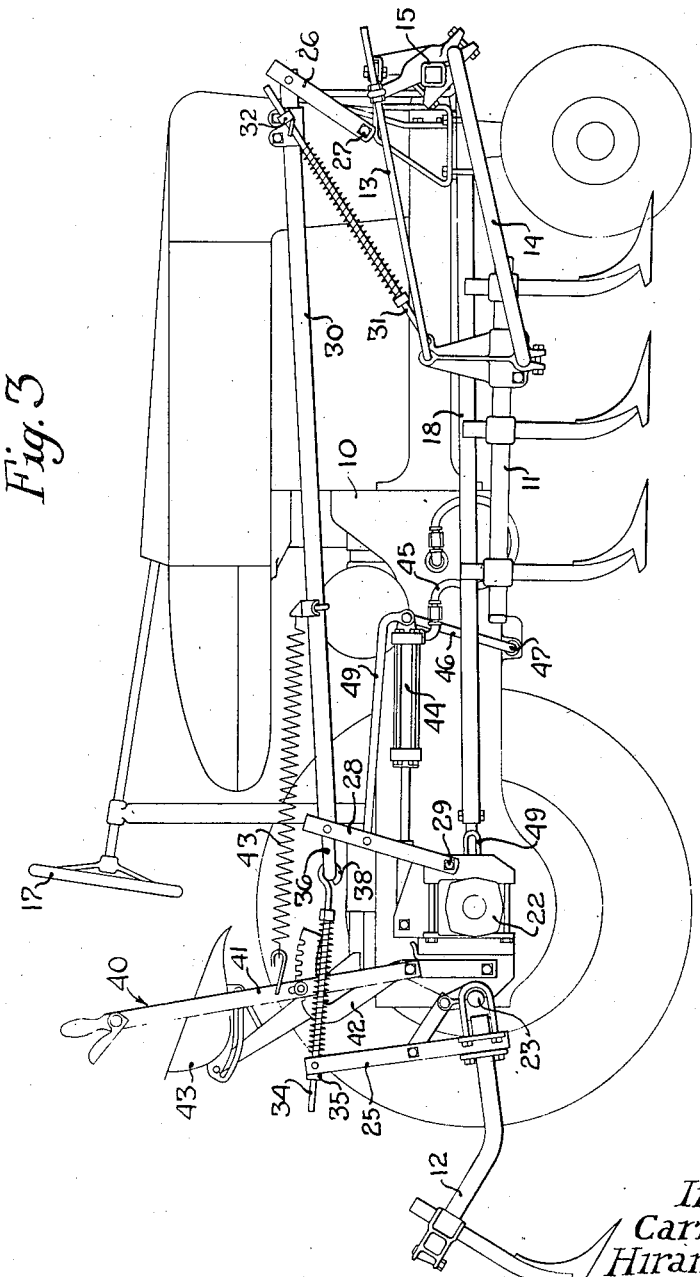

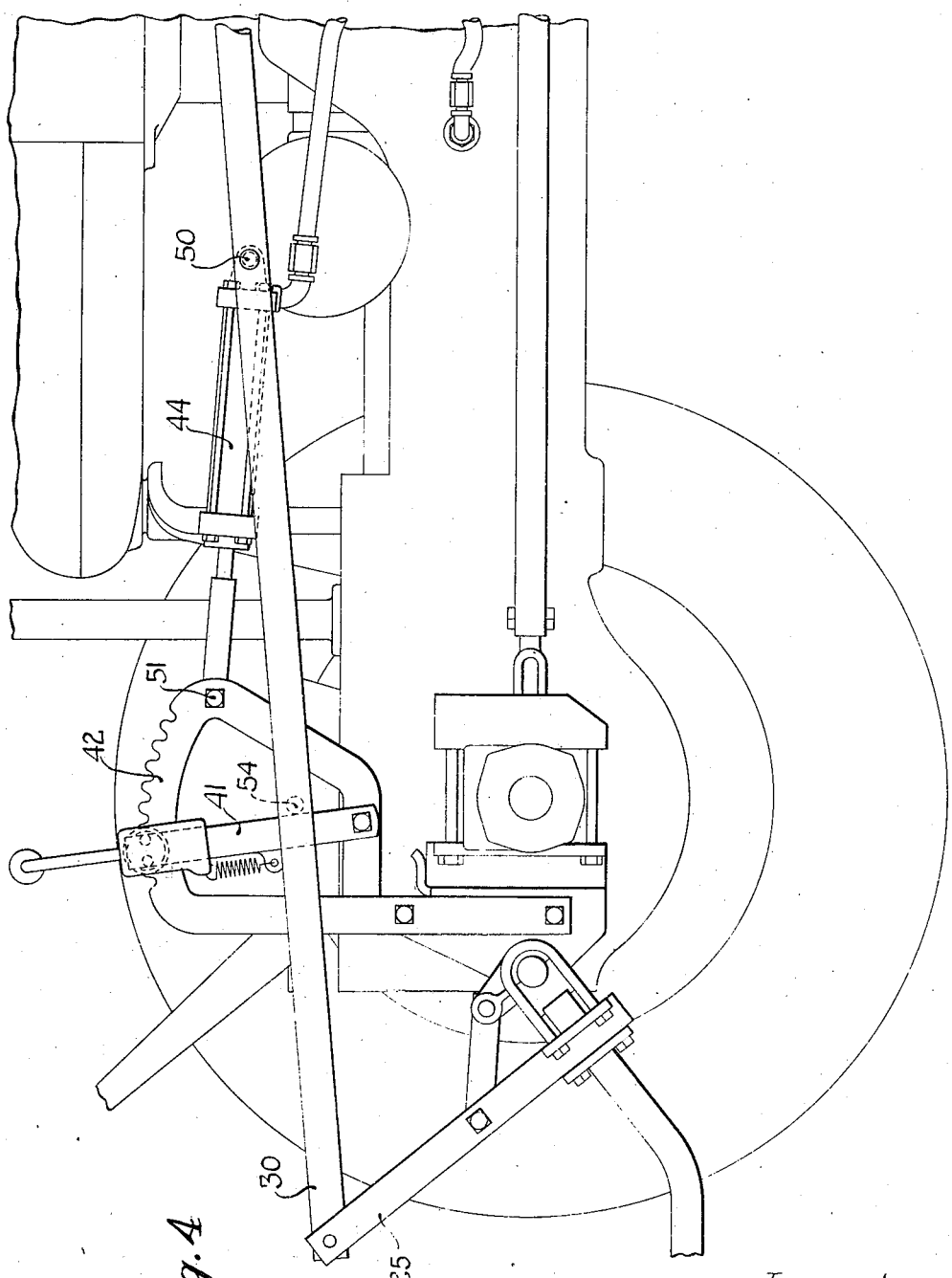

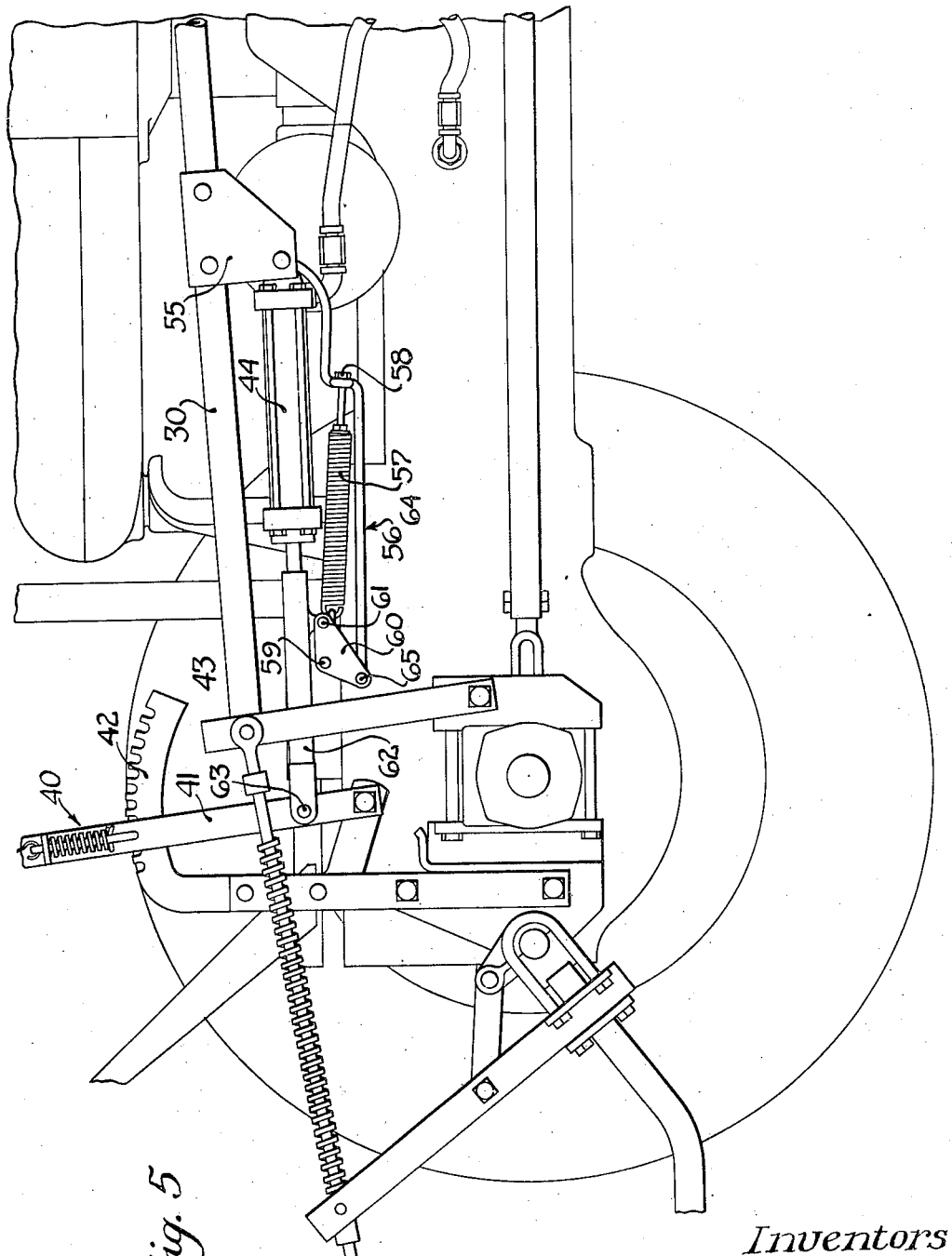

Patented July 20, 1943

2,324,867

UNITED STATES PATENT OFFICE 2,324,867

MOVABLE MEANS FOR TRACTOR MOUNTED IMPLEMENTS

Carl W. Mott, La Grange, and Hiram P. Smith, Canton, Ill., assignors to International Harvester Company, a corporation of New Jersey Application March 26, 1940, Serial No. 326,062

10 Claims. (Cl. 97—50)

This invention relates to means for moving or lifting implements connected to the tractor for movement, and particularly to a power lifting means for lifting implements connected to the tractor for vertical movement to a position for the transporting of the same.

An object of the invention is to provide a movable or lifting means to which implements located practically in any position along the extent of the tractor may be lifted by mere connection to the movable means, the movable means being in turn operated by power taken from the tractor.

It is another object of the invention to provide for association with said movable means an adjustable stop whereby all implements connected to the movable means may be simultaneously adjusted in their working position.

It is another object of the invention to provide a power actuated lifting means for tractors to which a plurality of implements may be connected, which is of simple construction.

It is still another object of the invention to provide a simple arrangement for lifting a plurality of implements wherein they will always be raised to a constant height regardless of their depth setting.

According to the present invention, there has been provided a pair of levers pivoted respectively at different locations on the tractor for movement about their respective pivots in a similar plane. Interconnecting these two levers, there is provided a rod member connecting with the free ends of the same and to which the lifting rods of the various implements may be connected to obtain a movement for the effecting of the lifting of the same. To this movable or lifting means, there is connected a power element for the purpose of moving the same, such that the interconnecting rod member will move fore and aft and in a vertical plane. Associated with the movable means for contacting engagement when the implements are in the working position, is an adjustable stop means against which the movable means will contact upon dropping the implements to their working positions. When power is applied to the movable means, the same will move forwardly to effect lifting of the implements to their positions of transport.

For a better understanding of the invention, reference may be had to the following detailed description taken in conjunction with the accompanying drawings, in which:

Figure 2 is a view in elevation of the same tractor with one wheel removed, showing the lifting means against the adjustable stop and with the implements in their working position;

Figure 3 is a view similar to Figure 2, showing the implements lifted to a transport position with the movable means having left the adjustable stop;

Figure 1:
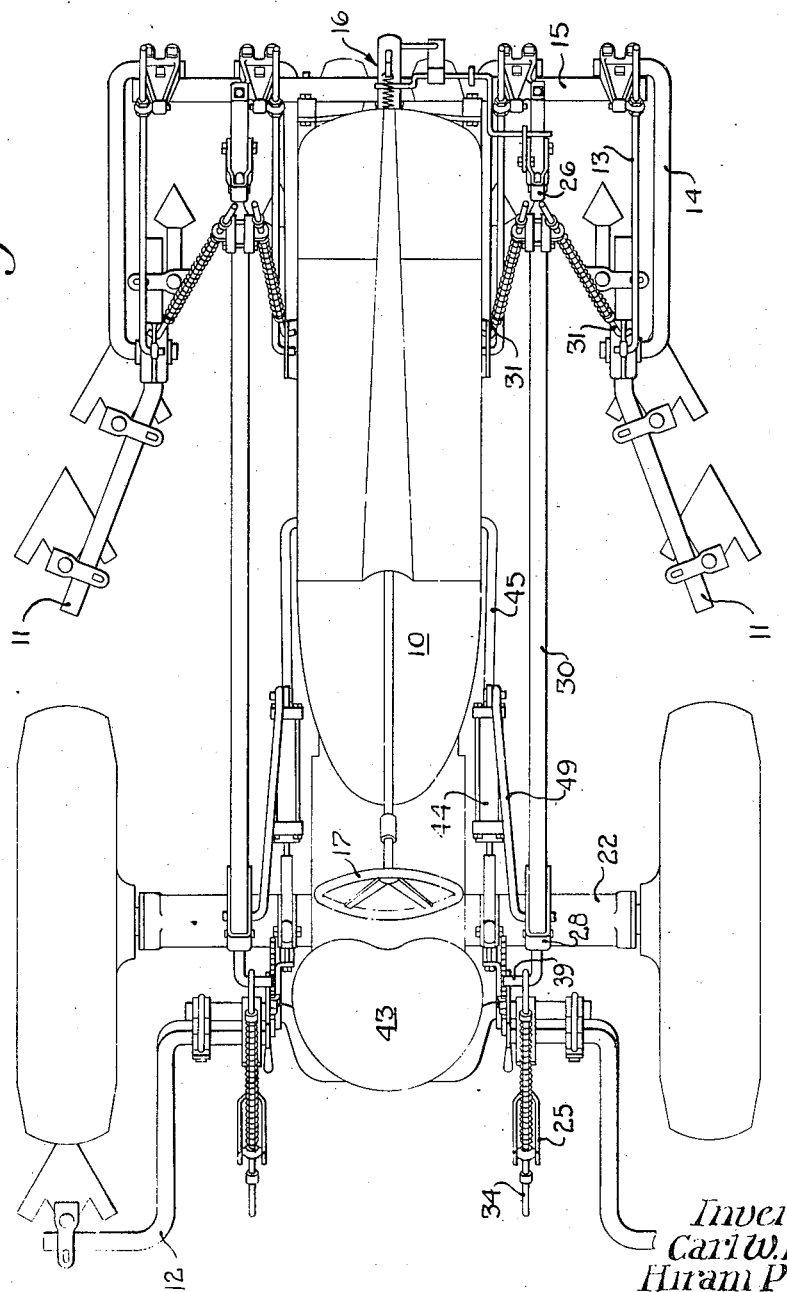
Figure 1 is a plan view of a tractor with implements connected at the front and rear of the same and embodying the movable means of the present invention for the purpose of moving the implements to their transport position.

Figure 4 is an enlarged view of the rear portion of the tractor, but showing a modified form of applying power to the movable means wherein the power means is connected directly to the interconnecting rod between the levers; and, Figure 5 is an enlarged view of the rear portion of the tractor, but showing a modified and preferred form of applying power to the movable means, wherein the power cylinder is adjusted bodily with movable means when making a depth adjustment of the implement.

Referring now particularly to Figures 1, 2, and 3, there is shown a tractor 10 having forward and rearward portions to which are connected respectively ground-working implements or cultivator rigs 11 and 12. These rigs are so connected to the tractor that they may be given vertical movement for the purpose of being moved to a transport position.

The rig 11 connected to the forward portion of the tractor is connected in a manner such as shown in the Patent No. 2,115,387 to W. S. Graham et al., issued April 26, 1938, wherein the rigs are connected through parallel links 13 and 14 to a transversely extending frame member 15 adapted to have transverse movement across the front of the tractor by virtue of the fact that the same is conneced by a mechanism 16 to the steering mechanism 17 of the tractor. The transverse movement of the supporting means 15 is guided by longitudinally extending push pipes 18, which are in turn connected at the rear of the tractor, as at 19. The push pipes 18 maintain the supporting means 15 spaced from the front of the tractor during the ground-working operation. The supporting means 15 is connected indirectly to the tractor through pendulum links 20, which are, in turn, pivoted to an attachment frame 21 on the tractor.

On the rearward portions of the tractor, there is provided a transversely extending axle structure 22 to which the rear rigs 12 may be directly connected, as at 23, for vertical pivotal movement. This attachment to the axle structure 22 may be made by a quick attaching bracket structure 24 in a manner well known in the art. The rear rig 12 may have rigidly connected thereto a vertically extending arm structure 25 through which power may be derived for the purpose of pivoting the rig about its pivot 23.

Carried by the supporting means 15 and thus indirectly connected to the tractor is a lever 26 adapted for pivotal movement about its pivot point 27 and in a vertical and longitudinally extending plane. On the rear of the tractor, there is likewise connected to the bracket structure 24 a second lever 28 pivoted at 29 to have a similar movement in a longitudinal vertical plane. Between these two levers is connected a rod member 30, for pivotal movement with respect thereto, at the free ends of the same. It should now be seen that there has been provided a movable means which extends substantially the entire length of the tractor and adapted to have motion generally in a vertical plane and in a fore and aft direction. This movable means comprises, in general, two pivoted levers, one at one location on the tractor, and a second at another location on the tractor and the free ends of the same being interconnected by a rod member. This rod member provides means located along the extent of the tractor from which the various independently connected implements may receive lifting power regardless of their position along the tractor. To this same lifting means may be connected the rig 11 located on the forward portion of the tractor or there may be connected the rig 12 located on the rear of the tractor.

The rig 11 is connected by means of a lift rod 31 to the rod 30 in a manner well known in the art. This lift rod 31 has a collar 32 at its upper end which will engage a plate 33 carried by the rod 30 upon its lever moving in a forward direction. As the collar 32 engages the plate 33, the rig 11 is pivoted about its connection with the transverse supporting member 15 and moved vertically to a transport position.

The rig 12 may be similarly connected to the rod member 30 at the rearward location by means of a lift rod 34 having a collar 35 adapted to engage with the arm structure 25 as the lift rod 34 is pulled forward by the rod member 30 that forms a part of the lifting means. This lift rod 34 may be connected directly to the rod member 30 or it may be connected by means of a plug member 36 disposed in the rear end of the rod 30, which is preferably in the form of a pipe. This plug can be maintained within the end of the rod 30 by a bolt 37 to form a connection for an eye portion 38 of the rod 34, the plug 36 being folded to provide a laterally extending portion 39, which portion also serves as a point with which the adjustable stop mechanism 40 may engage.

This adjustable stop mechanism 40 comprises a lever 41 and a quadrant 42, both of which are carried by the bracket structure 24 on the rear axle housing 22 of the tractor. The lever 41, in this position on the tractor, is accessible to an operator's seat or station 43. When it is desired to vary the working depth of the rigs 11 and 12, it may be accomplished by movement of the lever 41 over the quadrant 42 in the well known manner. The lever 41, near to the point of pivot on the quadrant 42, engages with the rear end of the laterally extending portion 39 of the plug 36. Movement of the lever 41 forwardly over the quadrant will provide a shallow depth-adjustment for the rigs 11 and 12, whereas movement of the lever 41 rearwardly over the quadrant 42 provides for deeper working depth of the rigs 11 and 12.

As a means for maintaining the movable means against the adjustable stop mechanism 40 with the rigs in their working position, there is provided a spring 43 connected between the lever 41 and the rod member 30 of the movable means. This spring 43 will maintain the same against the adjustable stop and at the same time tend to hold the rigs in their ground-working positions.

The movable or lifting means is adapted to be operated by a hydraulic cylinder 44 deriving fluid pressure through a flexible connection 45 from a fluid pressure device located within the shell of the tractor and adapted to be driven by the tractor mechanism. Such a hydraulic arrangement is shown in the pending application to A. C. Lindgren et al., Serial No. 181,778, filed December 27, 1937, now Patent No. 2,213,401, dated Sept. 3, 1940. While a hydraulic arrangement has been shown, it should be evident that any particular form of power means known to the art could be readily adapted to operate the movable means. Serving as a support for the movable portion of the cylinder device 44 is a swingable supporting lever 46 connected for pivotal movement to the tractor at 47. The cylinder device 44 is anchored to the bracket structure 24 at 48. The connection with the movable part of the device 44 to the movable means is made through a link 49 to the second lever 28 on the rear of the tractor. This cylinder device 44 is preferably of the single-acting type and serves to move the entire movable means in the forward direction thereby to effect lifting of the respective rigs 11 and 12. It should now be apparent from the above description that there has been provided on the tractor a movable means which extends considerably along the length of the tractor to which cultivator rigs located at any location along the length of the tractor may be connected for the effecting of lifting the same to a transport position.

Referring now to Figure 4, there is shown a modified, and perhaps more simple, form of the invention. In this modified structure, it is seen that it is unnecessary to provide both a lifting arm structure and a rear connected lever. Instead of having the rear lever in the form described above, the rod 30 may be connected directly to the arm structure 25 of the rear rig 12. Also, the structure has been simplified in that it is not necessary to provide a separate supporting structure for the hydraulic cylinder device 44. The same is connected directly at 50 to the rod 30, while the other end is connected to the adjustable stop mechanism. The adjustable stop mechanism with this form of the invention comprises a similar lever 41 and a quadrant 42, the lever 41 being adapted to serve as a stop for a laterally extending plug 54 connected to the pipe 30. While in this Figure 4, the forward end of the tractor and the connection of the pipe rod member 30 to the lever 26 is not shown, it can be assumed that the structure is the same as shown in Figures 1, 2, and 3. In both of the forms of the invention described thus far, it will be seen that the rigs will always be brought to the same height regardless of the setting of the adjustable mechanism. This is helpful, particularly when portions of the rigs need to extend under the tractor.

Referring now to Figure 5, there is shown a modified and preferred form of the invention.

This form of invention differs from the other forms in that no provision is made for obtaining a constant-height lift of the implements each time the power lift is operated. This form is similar to the form shown in Figure 4, except that, instead of the rearward portion of the cylinder device being connected to the stationary part or quadrant 42 of the adjustable mechanism 40, it is connected directly to the movable part or lever 41. The forward end of the cylinder device, however, is connected at 55 directly to the fore and aft movable rod member or pipe 30. Further, instead of having a spring device 43 of the type shown in Figure 2, there is provided a novel over-center spring arrangement interconnecting the lever 41 and the point of connection 55 of the cylinder device with the rod member 30. This spring device is shown and claimed in a copending application of Carl W. Mott and James Morkoski, and it is not being claimed by itself in the present application. This spring device is shown generally at 56 and comprises a spring 57 normally put under initial tension by adjusting the nut 58 and the same spring being connected to a point 59 of a pivoted element 60, which is pivoted at 61 to a sleeve 62, which is, in turn, directly pivoted to the adjusting lever 41 at 63. The outer end of the pivoted member 60 is connected with the plate 55 through a rod 64 relative to which the adjusting nut 58 is adjusted and the rearward end of which is connected with the pivoted lever 60 at 65. As the cylinder device 44 expands, the lever 60 will pivot about the point 61 to effect stretching of the spring 57, this spring also tending to maintain the cylinder device in a collapsed position, to render the cylinder device with the spring in effect a double-acting device.

The forward and rearward levers pivoted to the tractor are similar to both of the other forms of the invention and as well the rod member 30 interconnecting these two levers. But, since the cylinder device 44 is directly connected at 63 to the lever 42 of the adjusting mechanism, it will be moved bodily therewith upon an adjustment of the working depth of the implement being made, since the spring device normally maintains the cylinder 44 in its collapsed position so as to provide a substantially rigid structure of the movable means and the adjustable mechanism. The adjustment of the adjusting mechanism 40 being made will thereby cause bodily movement of the cylinder device 44 and movable means; the movable means being held at all times in rigid relationship with the lever 42 of the adjusting mechanism 40.

While it is apparent that detail changes may be made in the construction of the arrangement, it shall be understood that such changes shall be within the spirit and scope of the present invention as defined in the appended claims.

What is claimed is:

1. In combination, a tractor having forward and rearward portions and implement rigs respectively connected to said portions for vertical movement, a fore and aft movable lifting means extending along the side of the tractor between the forward and rearward portions thereof and including two levers respectively pivotally disposed upon said tractor portions for fore and aft movement of free ends thereof and a rod member interconnecting such free ends of the levers, power means for operating the lifting means in one direction, means for connecting the rigs to the lifting means to cause lifting of the rigs by the movement of the lifting means in such direction, and adjustable stop means on the rearward portion of the tractor adapted for engagement with said lifting means to limit movement of the same in the opposite direction.

2. In combination, a tractor having a forward portion and a rear axle structure on which there is located an operator's station, a lever pivoted for fore and aft movement on the forward portion of the tractor, a second lever pivoted on the rear axle structure for similar movement and located in rear of said operator's station, a rod member extending past the operator's station and connected with the free ends of the levers to be movable therewith, an implement connected to the second lever to be pivoted thereby, and adjustable stop means on the rear axle structure adjacent to the operator's station, said rod member intermediate the ends of the same having means adapted to be engaged by said stop means, whereby the working position of the implement may be regulated.

3. In combination, a tractor having a forward portion and a rear axle structure on which there is located an operator's station, a lever pivoted for fore and aft movement on the forward portion of the tractor, a second lever pivoted on the rear axle structure, a rod member extending past the operator's station and connected to the free ends of the levers to be movable therewith, an implement connected to the tractor for vertical movement, means for connecting the implement to the rod member to be moved by the same, adjustable stop means on the rear axle structure adjacent the operator's station and engageable with means on the rod member to limit the movement of the rod in one direction, and power means connected to the adjustable stop means and to the rod to operate the same for effecting vertical movement of said implement.

4. In combination, a tractor having forward and rearward portions, an implement at each side of the tractor and connected thereto for vertical movement, movable means for each of the respective implements located at each side of the tractor, each of said movable means including a first fore and aft lever connected to the forward portion of the tractor, a second fore and aft lever connected to the rearward portion of the tractor, a rod member pivotally connected between the free ends of said levers and movable therewith, means for connecting each of the implements to their respective movable means, adjustable stop mechanism for each movable means mounted on the tractor against which the movable means may rest when the implements are in their working positions, and a single-acting hydraulic operated cylinder connected to each of the movable means to move the same away from the adjustable stop mechanism and to effect movement of the respective implements to a position for transport on the tractor.

5. In combination, a tractor having forward and rearward portions, an implement connected to the tractor for vertical movement, movable means on the tractor including a first fore and aft pivoted lever connected to the forward portion of the tractor, a second fore and aft pivoted lever connected to the rearward portion of the tractor, a rod member pivotally connected between the respective free ends of said levers and movable therewith, means for connecting the implement to the movable means, adjustable stop mechanism mounted on the tractor against which the movable means may rest when the implement is in its working position, biasing means tending to maintain said movable means against the adjustable stop mechanism, and a single-acting hydraulic operated cylinder connected to the movable means to move the same away from the adjustable stop mechanism and against the action of said biasing means to effect movement of the implement to a position for transport on the tractor.

6. In combination, a tractor having forward and rearward portions, an implement connected to the tractor for vertical movement, movable means on the tractor including a first fore and aft pivoted lever connected to the forward portion of the tractor, a second fore and aft pivoted lever connected to the rearward portion of the tractor, a rod member pivotally connected between the respective free ends of said levers and movable therewith, means for connecting the implement to the movable means, adjustable stop mechanism mounted on the tractor against which the movable means may rest when the implement is in its working position, a single-acting hydraulic operated cylinder connected to the movable means to move the same away from the adjustable stop mechanism to effect movement of the implement to a transport position on the tractor, said cylinder being so connected with respect to the movable means whereby the implement will always be moved to the same height regardless of the adjustment of the setting of the adjustable stop mechanism.

7. In combination, a tractor having forward and rearward portions, an implement connected to the tractor for vertical movement, movable means on the tractor including a first fore and aft pivoted lever connected to the forward portion of the tractor, a second fore and aft pivoted lever connected to the rearward portion of the tractor, a rod member pivotally connected between the respective free ends of said levers and movable therewith, means for connecting the implement to the movable means, manually adjustable mechanism mounted on the tractor and including a movable part and a stationary part, and a single-acting hydraulic operated cylinder device connected between the movable part of the adjustable mechanism and the movable means, whereby, upon operation of the adjustable mechanism to vary the position of the implement, the same is effected by bodily movement of the cylinder device.

8. In combination, a tractor, an implement mounted on the tractor for movement from one position to another position, and movable means for moving the implement including spaced levers pivoted to the tractor and means connecting the free ends of the levers together to move with the same, manually adjustable mechanism carried by the tractor to locate the implement in one position, and a hydraulic cylinder device connected between the adjustable mechanism and the movable means whereby, upon operation of the adjustable mechanism to locate the implement in one position, the same is effected by bodily movement of the cylinder device.

9. In combination, a tractor having forward and rearward portions, an implement connected to the tractor for vertical movement, movable means on the tractor including a first fore and aft pivoted lever connected to the forward portion of the tractor, a second fore and aft pivoted lever connected to the rearward portion of the tractor, a rod member pivotally connected between the respective free ends of said levers and movable therewith, means for connecting the implement to the movable means, manually adjustable mechanism mounted on the tractor to locate the implement in one position, a hydraulic cylinder device connected between the adjustable mechanism and the movable means for moving the movable means to effect movement of the implement to a transport position on the tractor, and biasing means tending to maintain said movable means fixed with relation to the adjustable means whereby, upon operation of the adjustable mechanism to locate the implement in one position, the same will be effected by bodily movement of the cylinder device.

10. In combination, a tractor having forward and rearward portions, implements respectively connected to the forward and rearward portions of the tractor for independent vertical movement, there being at least one implement at each side of the tractor on the respective portions thereof, movable means on each side of the tractor for moving the implements on that side of the tractor, each of said movable means including spaced levers on the respective forward and rearward portions of the tractor and means interconnecting the free ends of the spaced levers, means for connecting the implements to their respective movable means, an adjustable stop mechanism for each movable means to limit the movement thereof in one direction, and power means operatively associated with the tractor and including individual devices for operating the respective movable means in the opposite direction to move the implements.

CARL W. MOTT.
HIRAM P. SMITH.